United States Patent
Gowda et al.

(10) Patent No.: US 9,056,358 B2
(45) Date of Patent: Jun. 16, 2015

(54) CUTTER ASSEMBLY

(75) Inventors: Sharath Shankare Gowda, Bangalore (IN); Krishna Prasad Vangipuram Ramaswamy, Bangalore (IN); Shivanna, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 387 days.

(21) Appl. No.: 13/438,893

(22) Filed: Apr. 4, 2012

(65) Prior Publication Data
US 2012/0257940 A1    Oct. 11, 2012

(30) Foreign Application Priority Data
Apr. 6, 2011  (IN) .......................... 1163/CHE/2011

(51) Int. Cl.
*B23C 5/26* (2006.01)
*B23C 5/06* (2006.01)
*B23B 31/113* (2006.01)

(52) U.S. Cl.
CPC ............. *B23C 5/26* (2013.01); *Y10T 407/1934* (2015.01); *Y10T 407/1936* (2015.01); *Y10T 29/49947* (2015.01); *Y10T 409/303752* (2015.01); *B23C 2210/02* (2013.01); *B23C 2240/04* (2013.01); *B23B 31/113* (2013.01); *Y10T 409/309408* (2015.01); *B23C 5/06* (2013.01)

(58) Field of Classification Search
CPC ............ B23C 2210/02; B23C 2240/04; B23B 31/113; Y10T 409/309408; Y10T 409/30952; Y10T 279/17888; Y10T 279/17897
USPC ................................ 409/232, 234; 279/93, 94
IPC ......................................................... B23C 5/26
See application file for complete search history.

(56) References Cited

U.S. PATENT DOCUMENTS 2,051,965 A     8/1936  Roth
3,855,680 A  * 12/1974  Wirefelt ......................... 407/34
(Continued)

FOREIGN PATENT DOCUMENTS

| DE | 3401128 A1 | 8/1984 | |
| JP | 53085589 A * | 7/1978 | ............... B23C 5/26 |
| JP | 09150308 A | 6/1997 | |
| JP | 09155625 A | 6/1997 | |
| JP | 09309022 A | 12/1997 | |
| JP | 11129111 A | 5/1999 | |

OTHER PUBLICATIONS

JPO Machine Translation—Mizuki, Yoshitomo, "Milling Device," May 18, 1999.*

*Primary Examiner* — Daniel Howell
*Assistant Examiner* — Michael Vitale
(74) *Attorney, Agent, or Firm* — Larry R. Meenan (57) ABSTRACT

A cutter assembly a back plate adapted to be mounted on a machine spindle. The back plate has a stepped portion on its outer circumference. The stepped portion of the back plate including a plurality of circular sectors and locating surfaces at predetermined locations on the outer circumference. A cutter ring is adapted to mount on an outer circumference of the stepped portion of the back plate, and a fastening member is adapted to connect the cutter ring with the back plate.

10 Claims, 7 Drawing Sheets

(56) References Cited

U.S. PATENT DOCUMENTS

| | | |
|---|---|---|
| 4,061,076 A | 12/1977 | Robertson |
| 4,204,787 A | 5/1980 | McCray et al. |
| 5,061,129 A * | 10/1991 | Baudermann ................ 409/234 |
| 5,135,337 A | 8/1992 | Adamson |
| 5,197,231 A * | 3/1993 | Pedersen et al. .............. 451/540 |
| 5,215,417 A * | 6/1993 | Ball et al. ...................... 409/234 |
| 6,942,437 B2 | 9/2005 | Ripley et al. |
| 7,544,020 B2 | 6/2009 | Emoto et al. |

* cited by examiner

CUTTER ASSEMBLY

CLAIM TO PRIORITY

This application is a National entry application of Indian Application No. 1163/CHE/2011, filed Apr. 6, 2011, the entire contents of which is incorporated herein by reference.

FIELD OF THE INVENTION

The present disclosure relates to a milling cutter, and more particularly to a split type milling cutter that can be disassembled into plurality of mating parts.

BACKGROUND OF THE INVENTION

The conventional large diameter milling cutters are heavy and it is very difficult to handle such type of heavy milling cutters at the customer shop floor. It is desired to have a new milling adaptation system so that cutter becomes light and easy to handle at customer shop floor.

The existing split design milling cutter comprise of a back plate, which is mounted onto the spindle and a cutter ring with inserts mounted, which will be secured to the back plate. The customer still finds it difficult to mount cutter ring onto the back plate because of close tolerance between the cutter ring and the back plate. Even a slight tilt in the axis due to weight of cutter ring will make the entry of cutter ring into the back plate difficult. This is because entire circumferential locating face of back plate comes in contact with the inner face of the cutter ring. Sometimes, the cutter ring gets stuck in misaligned position affecting cutter run out (both axial and radial).

Further, the existing split design milling cutter comprises two drive tenons which are required for torque transmission. Hence, the positioning of the cutter ring on to the back plate is still difficult. It involves lot of hardware like pins, springs and single central cap screw for clamping cutter ring to fixture. Operator is required to always align arrow marks of the back plate and the cutter ring for proper mounting.

In addition, the locating surface of the existing split design milling cutter is fully cylindrical. The minimum clearance between the locating surfaces of cutter ring and fixture is 15 microns and maximum clearance is 35 microns, making mounting difficult in case of a slight tilt of cutter ring while mounting.

SUMMARY OF THE INVENTION

Accordingly the present disclosure provides for a cutter assembly (100) comprising; a back plate (101) adapted to mount on a machine spindle (C), wherein said back plate (101) having stepped portion (201) on its surface; which comprises plurality of circular sectors (202) and locating surfaces (203) at predetermined locations in its outer circumference; a cutter ring (102) adapted to mount on outer circumference of the stepped portion (201) of the back plate (101); and a fastening members (103) to connect said cutter ring (102) with the back plate (101), and also provides a method of assembling a cutter assembly (100) comprises acts fastening a back plate (101) on the machine spindle (C), wherein said back plate (101) having stepped portion (201) on its surface; which comprises plurality of circular sectors (202) and locating surfaces (203) at predetermined locations in its outer circumference; inserting a plurality of fastening members (103) into holes (401) provided on the back plate (101) for guiding a cutter ring (102); mounting the cutter ring (102) on the stepped portion (201) of the back plate (101), wherein said cutter ring (102) has plurality of bayonet slots (301) for passing the fastening members (103); rotating the cutter ring (102) in predetermined direction to lock the fastening members (103) in the bayonet slots (301); and tightening the fastening members (103) to secure the cutter ring (102) against the back plate (101).

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn inter-alia, to a milling cutter. More particularly, embodiments of the disclosure relates to the split type milling cutters that can be disassembled into plurality of mating parts.

One embodiment of the present disclosure provides a cutter assembly. Said cutter assembly comprises; a back plate (101) adapted to mount on a machine spindle (C), wherein said back plate (101) having stepped portion (201) on its surface; which comprises plurality of circular sectors (202) and locating surfaces (203) at predetermined locations in its outer circumference; a cutter ring (102) adapted to mount on outer circumference of the stepped portion (201) of the back plate (101); and fastening members (103) to connect said cutter ring (102) with the back plate (101).

In one embodiment of the present disclosure, the circular sectors (202) are provided between the locating surfaces (203), tangentially around the outer circumference of the stepped portion (201).

In one embodiment of the present disclosure, the circular sectors (202) are provided for mounting of the cutter ring (102) onto the back plate (101).

In one embodiment of the present disclosure, the locating surface (203) maintains a localized contact with the cutter ring (102) at working position.

In one embodiment of the present disclosure, at least one drive tenon (204) is provided on the back plate (101).

In one embodiment of the present disclosure, the fastening members (103) are selected from the group comprising socket head cap screws, threaded bolts, hex lobular screws or any fasteners would also serve the purpose.

In one embodiment of the present disclosure, the back plate (101) is provided with) socket head cap screws (103) to couple with the cutter ring (102).

In one embodiment of the present disclosure, the cutter ring (102) comprises plurality of bayonet slots (301) to accommodate the fastening members (103).

In one embodiment of the present disclosure, the bayonet slots (301) comprises hole (301b) to pass head portions (103a) of the fastening member (103) and hole (301a) to accommodate base portions (103b) of the fastening member (103).

In one embodiment of the present disclosure, the cutter ring (102) comprises plurality of tenon slots (302) at predetermined locations to make contact with the drive tenon (204).

The present disclosure is also relation with the method of assembling a cutter assembly (100) comprises acts fastening a back plate (101) on the machine spindle (C), wherein said back plate (101) having stepped portion (201) on its surface; which comprises plurality of circular sectors (202) and locating surfaces (203) at predetermined locations in its outer circumference; inserting plurality of fastening members (103) into holes (401) provided on the back plate (101) for guiding a cutter ring (102); mounting the cutter ring (102) on the stepped portion (201) of the back plate(101), wherein said cutter ring (102) has plurality of bayonet slots (301) for passing the fastening members (103); rotating the cutter ring (102) in predetermined direction to lock the fastening members (103) in the bayonet slots (301); and tightening the fastening members (103) to secure the cutter ring (102) against the back plate (101).

In one embodiment of the present disclosure, gap is created between the back plate (101) and the cutter ring (102) during mounting/dismounting of cutter ring (102) on to the back plate (101).

In one embodiment of the present disclosure, a drive tenon (204) is provided on the back plate (101) for transmitting the torque.

In one embodiment of the present disclosure, plurality of tenon slots (302) are provided in the cutter ring (102) at predetermined locations to accommodate the drive tenon (204).

In one embodiment of the present disclosure, the cutter ring (102) is rotated in the direction opposite to the direction of cutting to lock the fastening members (103) in the bayonet slots (301).

One embodiment of the present disclosure provides a method of milling using a cutter assembly.

Figure 1:
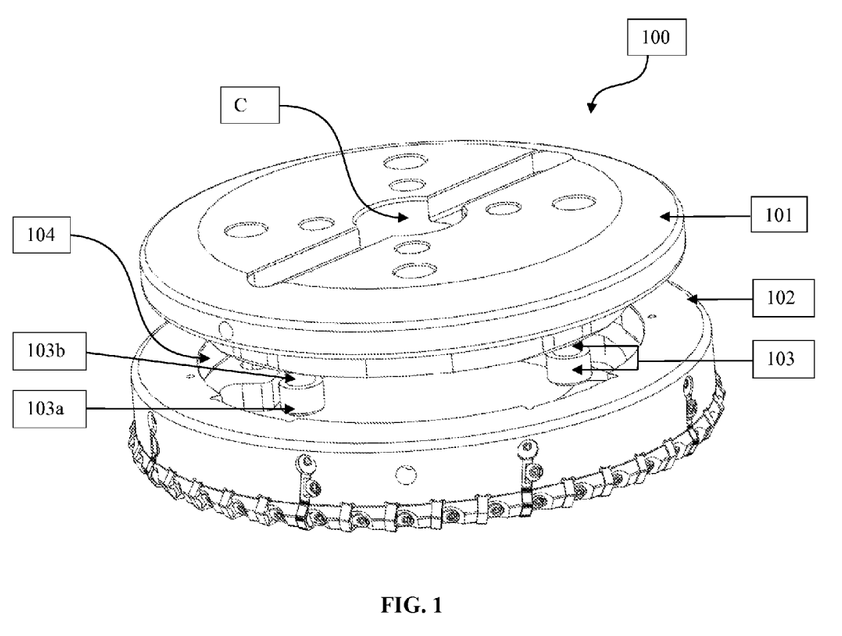
FIG. 1 illustrates the perspective view of the cutter assembly.

FIG. 1 in an exemplary embodiment illustrates the cutter assembly (100) according to the present disclosure. Said cutter assembly (100) comprises a back plate (101) mounted on the machine spindle (C) to support and drive a cutter ring (102) along with the machine spindle (C). A cutter ring (102) of circular shape with inserts mounted on the outer circumference, having its outer diameter adapted to mount on to the back plate (101). Plurality of fastening members (103) are provided in the cutter assembly (100) to fasten the cutter ring (102) to the back plate (101).

In one embodiment of the present disclosure, the fastening members (103) are selected from the group comprising; socket head cap screws, threaded bolts, hex lobular screws or any fastener would also serve the purpose.

In one embodiment of the present disclosure, the socket head cap screws (103) made of head portion (103a) and the base portion (103b) to engage with bayonet slots (301) for easy mounting/dismounting of the cutter ring (102) with the back plate (101).

Figure 2:
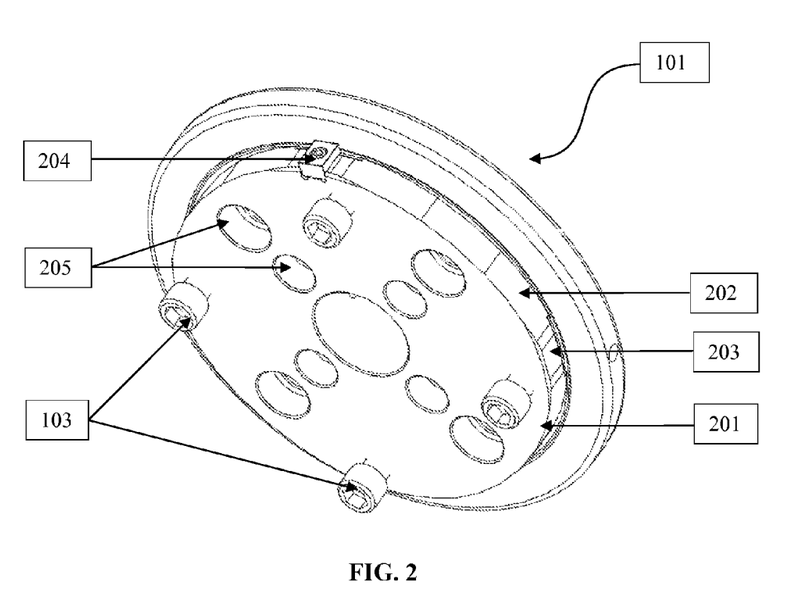
FIG. 2 illustrates the back plate of the present disclosure.

FIG. 2 in an exemplary embodiment illustrates the back plate (101) according to the present disclosure. The back plate (101) is used to fix to the machine spindle (C) and forms butting surface for the cutter ring (102). The back plate (101) comprises stepped portion (201). The stepped portion (201) of the back plate (101) is the locating portion of cutter ring (102). The locating portion has a locating surface (203) to provide localized contact of the back plate (101) with the cutter ring (102) during working and to ensure good radial run out. A plurality of circular sectors (202) are provided tangentially around the circumference of the stepped portion (201) for ensuring no contact of locating surface (203) during mounting and dismounting of the cutter ring (102) on to the back plate (101). The circular sectors (202) help to mount the cutter ring (102) easily onto the back plate (101) which is mounted on the machine spindle (C).

In one embodiment of the present disclosure, the back plate (101) is provided with drive tenon (204) at predetermined location for transmitting required torque to the cutter ring (102) for its operation. The drive tenon (204) can be provided on the locating surface (203) of the back plate (101) or at any predetermined peripheral location of the back plate (101). More than one drive tenon (204) can be provided if more torque is required.

Figure 3:
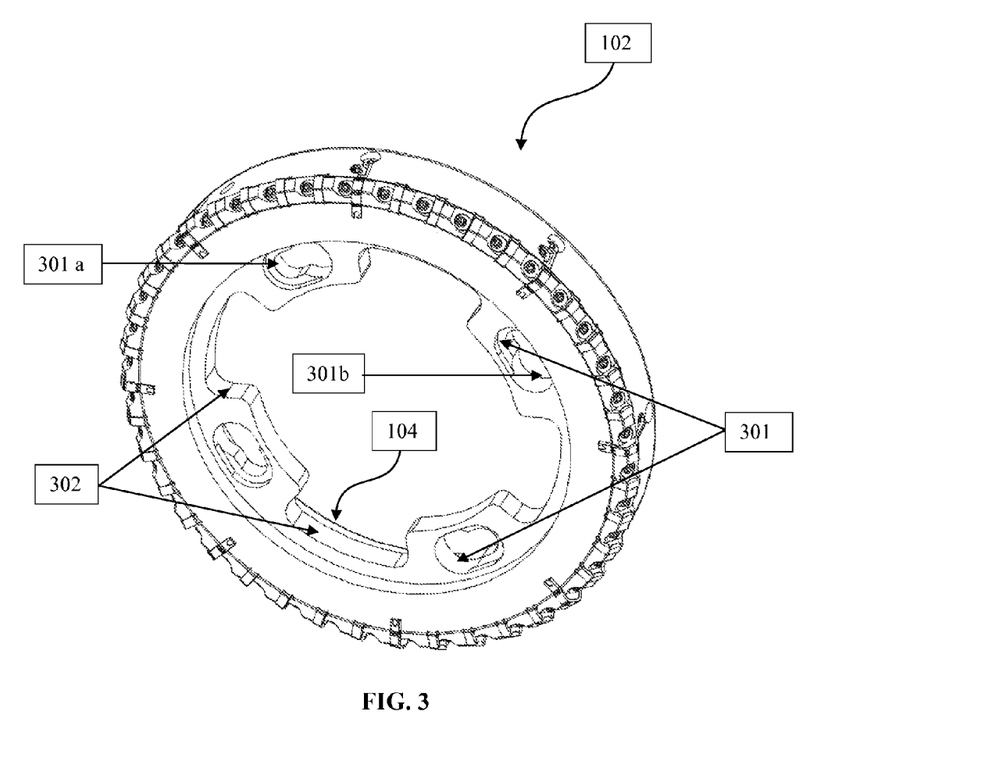
FIG. 3 illustrates the cutter ring of the present disclosure.

FIG. 3 in an exemplary embodiment illustrates the cutter ring (102) according to the present disclosure. The cutter ring (102) having inserts mounted on its outer circumference has the outer diameter matching with the diameter of the back plate (101). A cutter ring (102) comprises a milled hole (104) up to predetermined extent matching with the outer circumference of the stepped portion (201) for mounting the cutter ring (102) on to the back plate (101). The cutter ring (102) further comprises plurality of bayonet slots (301) for easy mounting/dismounting of the cutter ring (102) and to support the cutter ring (102) during cutting.

In addition, the cutter ring (102) comprises plurality of tenon slots (302) for drive tenon (204) engagement and to facilitate easy mounting/dismounting of the cutter ring (102) with the back plate (101).

In one embodiment of the present disclosure, the bayonet slots (301) provided on the cutter ring comprises two holes (301a and 301b), wherein the hole (301b) is having diameter slightly more than the diameter of the head portion (103a) of the socket head cap screw (103) to ensure easy mounting/dismounting of the cutter ring (102) with the back plate (101). The hole (301a) of the bayonet slot (301) has diameter less than the diameter of (301b) to accommodate the base portion (103b) of the socket head cap screw (103) for locking the cutter ring (102) with the back plate (101) during working. The cutter ring (102) is placed on the back plate (101) with head portions (103a) aligned with the hole (103b). After placing the cutter ring (102), the cutter ring (102) is rotated to move the base portions (103b) in to the hole (301a). After this, the cap screws (103) are tightened to firmly mount the cutter ring (102) on the back plate (101). Now the cutter ring (102) is in working position.

Figure 4:
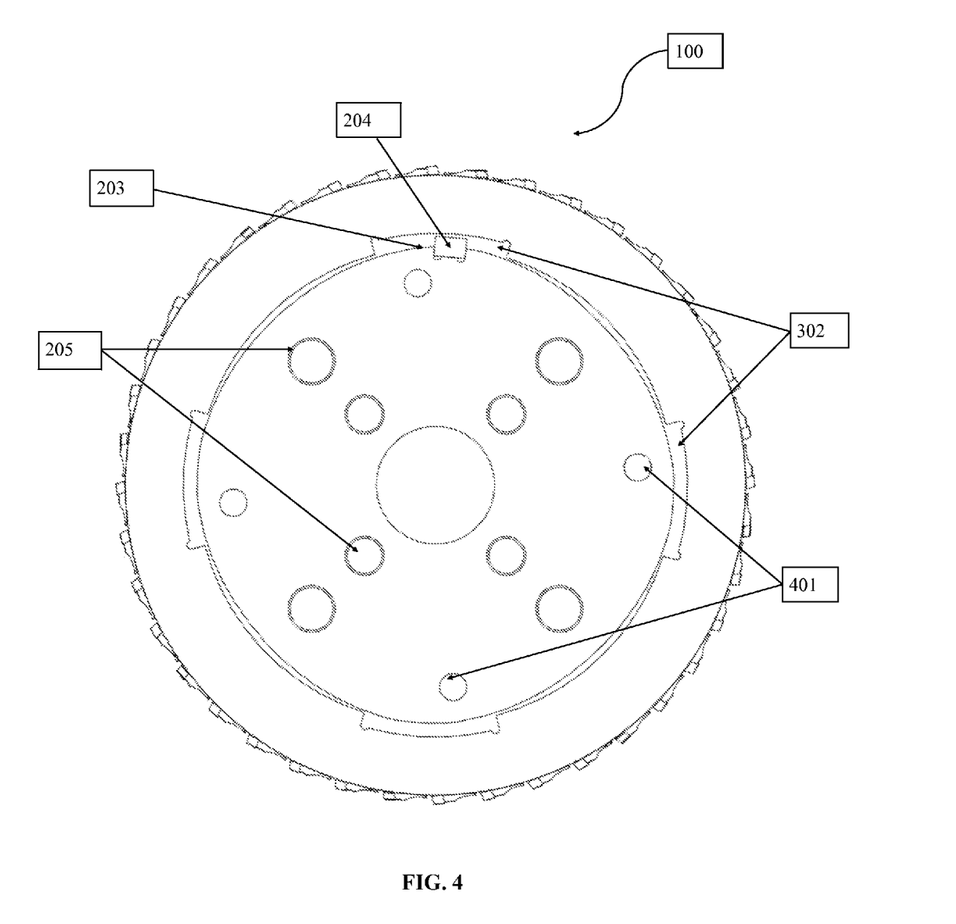
FIG. 4 illustrates the sectional view of the cutter assembly in mounting/dismounting position.

FIG. 4 in an exemplary embodiment illustrates the sectional view of the cutter assembly (100) in mounting/dismounting position. In mounting/dismounting position the locating surface (203) and the drive tenon (204) of the back plate (101) are well inside the tenon slots (302) provided on the cutter ring (102).

Figure 5:
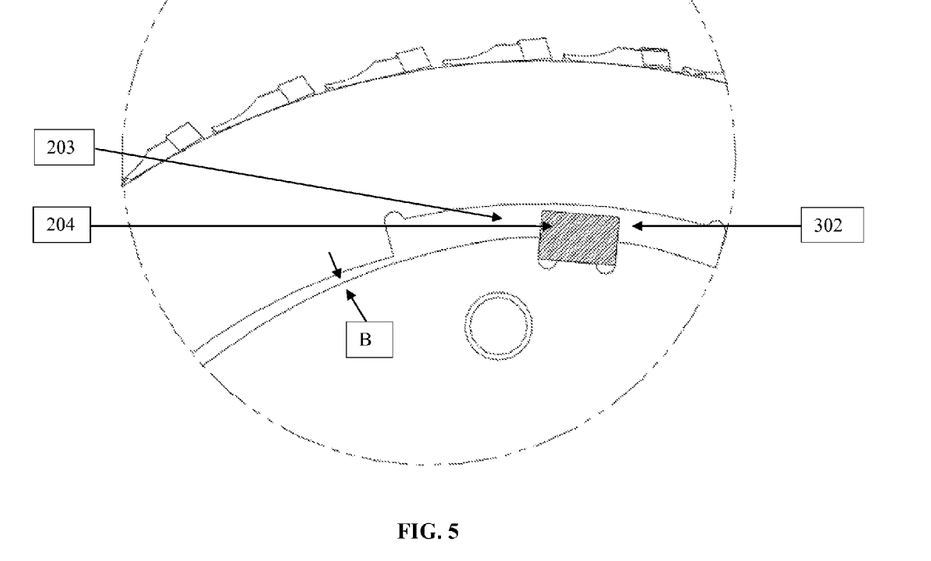
FIG. 5 illustrates the enlarged view of position of the drive tenon and the locating surface in mounting/dismounting position.

FIG. 5 in an exemplary embodiment illustrates enlarged view of position of the drive tenon (204) and the locating surface (203) in mounting/dismounting position. The locating surface (203) and the drive tenon (204) of the back plate (101) enters in to the tenon slots (302) of the cutter ring (102) during mounting/dismounting of the cutter ring (102) on to the back plate (101). This provides the clearance between the cutter ring (102) and the back plate (101) for easy mounting/dismounting. The clearance (B) is clearly visible in FIG. 5.

Figure 6:
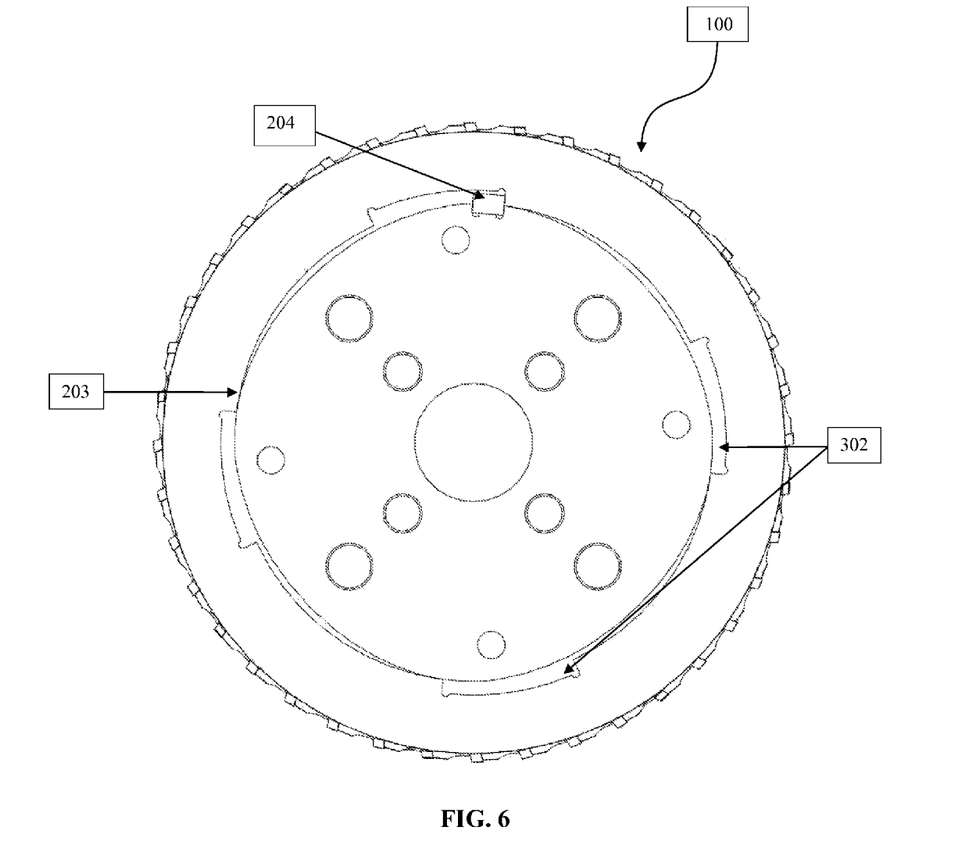
FIG. 6 illustrates the sectional view of the cutter assembly in working position.

FIG. 6 in an exemplary embodiment illustrates the sectional view of the cutter assembly (100) in working position. In working position of the cutter assembly (100), locating surface (203) of the back plate (101) is in localized contact with the cutter ring's (102) inner circumference to provide good radial run out. Further, the drive tenon (204) is in contact with the wall of the tenon slot (302) for transmitting the torque to the cutter ring (102).

Figure 7:
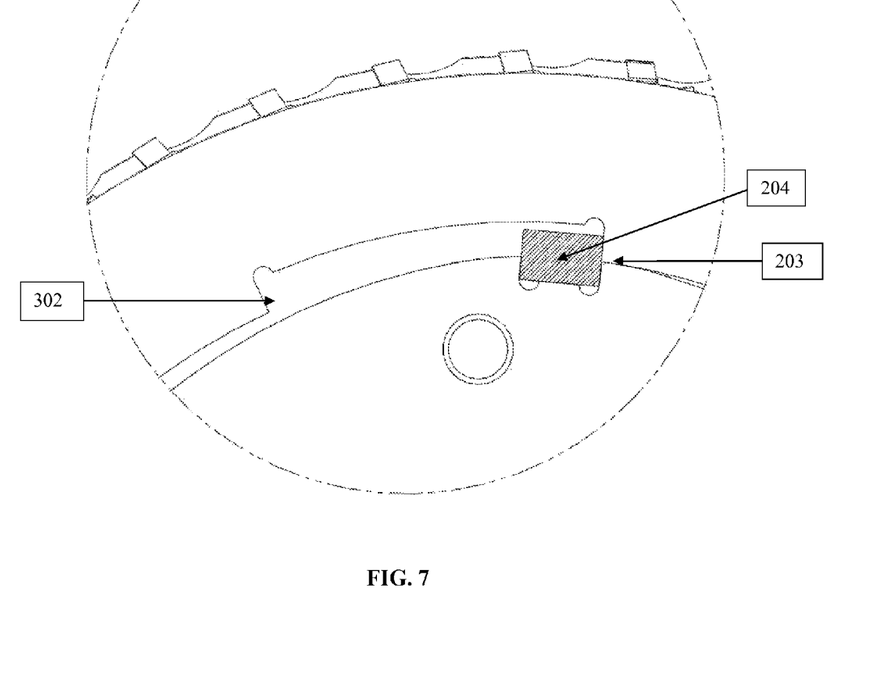
FIG. 7 illustrates the enlarged view of the position of the drive tenon and the locating surface in working position.

FIG. 7 in an exemplary embodiment illustrates enlarged view of the position of the drive tenon (204) and the locating surface (203) in working position. During working position, the locating surface (203) of the back plate (101) is in localized contact with the cutter ring (102) to ensure good radial run out. The drive tenon (204) will butt against the butting surface of tenon slot (302) to transmit the torque required for cutting and to provide positive drive to the cutter ring (102).

To assemble the cutter assembly on to a machine spindle (C) fallowing steps are fallowed installing a fixture on to the machine spindle (C) to secure the back plate (101). A cutter ring (102) is then mounted on to the back plate (101) with plurality of socket head cap screws (103). During mounting, the locating surface (203) and the drive tenon (204) of the back plate (101) are designed to enter into the tenon slots (302) for easy mounting of the cutter ring (102). The cutter ring (102) is placed on the back plate (101) with head portions (103a) aligned with the hole (301b). Then the cutter ring is rotated in predetermined direction to lock the cutter ring (102) with the back plate (101) and to make contact with the drive tenon (204). Then, tightening the cap screws (103) to secure the cutter ring (102) with the back plate (101).

In one embodiment of the present disclosure, the cutter ring (102) is mounted on to the stepped portion (201) of the back plate (101). During mounting, the head portion (103a) of the socket cap head screws (103) enters into hole (301b) of the bayonet slots (301). After mounting, the cutter ring (102) is rotated in predetermined direction such that the base portion (103b) of the socket head cap screw (103) rests in the hole (301a) of the bayonet slot (301).

During dismounting of the cutter ring (102), the socket head cap screws (103) are loosened and the cutter ring (102) is rotated in the direction of cutting. Then the cutter ring (102) is dismounted from the back plate (101).

In one embodiment of the present disclosure, the same back plate (101) can be used for both left hand and right hand cutters and the cutting directions of left hand and right hand cutters are counter clock wise and clock wise respectively with respect to the spindle axis.

In one embodiment of the present disclosure, the bayonet slot (301) design is modified in the cutter ring (102) to use the same back plate (101) for both left hand and right hand cutters.

In one embodiment of the present disclosure, the cutter ring (102) is rotated about 10-15 degrees opposite to the cutting direction till the engagement of the cutter ring (102) with the drive tenon (204).

In one embodiment of the present disclosure, the drive tenon (204) makes contact with butting surface of the tenon slots (302) to provide positive drive. In one embodiment of the present disclosure, the back plate (101) provided with plurality of holes (205) on its surface to mount the back plate (101) on to the machine spindle. The holes (205) provided on the back plate (101) are according to the industrial standards.

In one embodiment of the present disclosure, the back plate (101) comprises plurality of holes (401) for mounting the fastening members (103).

Advantages

The present disclosure provides a cutter assembly which can be disassembled into plurality of mating parts, hence can be easily handled and less man power is required.

The back plate of the present disclosure can be used for both right hand and left hand milling cutters. Hence, the cutter assembly is economical and consumes less lead time.

The present disclosure provides a cutter assembly which can be easily mounted and dismounted to the machine spindle.

The locating surfaces makes localized contact with the cutter assembly during working to provide good radial run out. Hence life of the cutter assembly is enhanced.

Equivalents

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals

| Referral numeral | Description |
| --- | --- |
| 100 | Cutter assembly |
| 101 | Back plate |
| 102 | Cutter ring |
| 103 | Fastening members |
| 103a | Head portion of the fastening member |
| 103b | Base portion of the fastening member |
| 104 | milled hole on the cutter ring |
| 201 | stepped portion on back plate |
| 202 | Circular sectors |
| 203 | Locating surface |
| 204 | Drive tenon |
| 205 | Holes on the back plate |
| 301 | Bayonet slots |
| 301a and 301b | Holes of the Bayonet slots |
| 302 | Tenon slots |
| 401 | Holes on the back plate to mount the fastening members |
| B | Clearance between cutter ring and the back plate |
| C | Machine spindle |

What is claimed is:

1. A cutter assembly comprising:
a back plate adapted to be mounted on a machine spindle, said back plate having a stepped portion having an outer circumference and including a plurality of circular sectors and locating surfaces at predetermined locations on the outer circumference, the back plate further including a drive tenon extending radially outward from the outer circumference of the stepped portion and at least one fastening member extending in a longitudinal direction; and
a cutter ring adapted to be mounted on the outer circumference of the stepped portion of the back plate, the cutter ring including a plurality of bayonet slots adapted to receive the at least one fastening member of said back plate when mounting the cutter ring onto the back plate, and a plurality of tenon slots adapted to receive the drive tenon of said back plate when mounting the cutter ring onto the back plate,
wherein a clearance, B, is created between the back plate and the cutter ring when mounting and dismounting the cutter ring onto the back plate, and
wherein one of the locating surfaces of said back plate provides localized contact between the back plate and the cutter ring when the cutter ring is mounted onto the back plate in a working position to minimize radial run out; and
wherein the drive tenon contacts a wall of one of plurality of tenon slots when the cutter ring is mounted onto the back plate in the working position to transmit torque from the back plate to the cutter ring.

2. The cutter assembly as claimed in the claim 1, wherein the circular sectors are provided between the locating surfaces tangentially around the outer circumference of the stepped portion.

3. The cutter assembly as claimed in the claim 1, wherein the circular sectors provide clearance when mounting the cutter ring onto the back plate.

4. The cutter assembly as claimed in the claim 1, wherein the locating surfaces maintains a localized contact with the cutter ring when the cutter assembly is placed in the working position.

5. The cutter assembly as claimed in the claim 1, wherein a drive tenon is provided on the back plate.

6. The cutter assembly as claimed in the claim 1, wherein the at least one fastening member is selected from the group comprising a socket head cap screw, a threaded bolt, and a hex lobular screw.

7. The cutter assembly as claimed in claim 1, wherein the at least one fastening member comprises a socket head cap screw.

8. The cutter assembly as claimed in the claim 1, wherein the plurality of bayonet slots comprises a hole to pass a head portion of the at least one fastening member therethrough and a hole to accommodate a base portion of the fastening member.

9. A method of assembling a cutter assembly comprising:
fastening a back plate on a machine spindle, wherein said back plate has a stepped portion on its surface, the stepped portion including a plurality of circular sectors and locating surfaces at predetermined locations on an outer circumference of the stepped portion, and a drive tenon extending radially outward from the outer circumference of the stepped portion;
inserting a plurality of fastening members into holes provided on the back plate for guiding a cutter ring;
mounting the cutter ring on the stepped portion of the back plate, wherein said cutter ring has a plurality of bayonet slots for passing the plurality of fastening members therethrough, and wherein said cutter ring has a plurality of tenon slots for passing the drive tenen therethrough;
rotating the cutter ring in a predetermined direction to lock the plurality of fastening members in the bayonet slots; and
tightening the plurality of fastening members to secure the cutter ring against the back plate,
wherein a clearance, B, is created between the back plate and the cutter ring when mounting and dismounting the cutter ring onto the back plate, and
wherein one of the locating surfaces of said back plate provides localized contact between the back plate and the cutter ring when the cutter ring is mounted onto the back plate in a working position to minimize radial run out; and wherein the dive tenon contacts a wall of one of plurality of tenon slots when the cutter ring is mounted onto the back plate in the working position to transmit torque from the back plate to the cutter ring.

10. The method as claimed in the claim 9, wherein the cutter ring is rotated in a direction opposite to a direction of cutting to lock the fastening members in the bayonet slots.

* * * * *